United States Patent [19]

Cline et al.

[11] Patent Number: 4,984,157

[45] Date of Patent: Jan. 8, 1991

[54] SYSTEM AND METHOD FOR DISPLAYING OBLIQUE PLANAR CROSS SECTIONS OF A SOLID BODY USING TRI-LINEAR INTERPOLATION TO DETERMINE PIXEL POSITION DATAES

[75] Inventors: Harvey E. Cline, Schenectady; William E. Lorensen, Ballston Lake; Siegwalt Ludke, Scotia, all of N.Y.

[73] Assignee: General Electric Company, Schenectady, N.Y.

[21] Appl. No.: 247,183

[22] Filed: Sep. 21, 1988

[51] Int. Cl.$^5$ ............................................. G06F 15/38
[52] U.S. Cl. ................................. 364/413.13; 364/522
[58] Field of Search .................. 364/413.13, 521, 522; 340/728-729

[56] References Cited

U.S. PATENT DOCUMENTS

| | | | |
|---|---|---|---|
| 4,280,178 | 7/1981 | Nassi et al. | 364/413.18 |
| 4,674,046 | 6/1987 | Ozeki et al. | 364/413.18 |
| 4,710,876 | 12/1987 | Cline et al. | 364/414 |
| 4,719,585 | 1/1988 | Cline et al. | 364/518 |
| 4,729,098 | 3/1988 | Cline et al. | 364/414 |
| 4,751,643 | 6/1988 | Lorensen et al. | 364/414 |
| 4,789,933 | 12/1988 | Chen et al. | 364/413.13 |
| 4,868,748 | 9/1989 | Crawford et al. | 364/413.22 |
| 4,914,589 | 4/1990 | Crawford | 364/413.17 |

OTHER PUBLICATIONS

J. D. Foley et al., *Fundamentals of Interactive Computer Graphics*, pp. 255-261, Addison-Wesley Publishing Co., Reading Mass., 1982.

*Primary Examiner*—Michael R. Fleming
*Assistant Examiner*—Gail O. Hayes
*Attorney, Agent, or Firm*—Marvin Snyder; James C. Davis, Jr.

[57] ABSTRACT

A method and apparatus for displaying arbitrary cross-sectional views of a three-dimensional body from a regular array of values of at least one physical property in the interior of the body includes making physical property measurements with such systems as computerized tomographic x-ray systems, or magnetic resonance imaging systems. Cut planes are defined by the user as displacement from, and rotations from, an arbitrary coordinate origin in the data space. An initial plane of pixel positions of arbitrary density is displaced and rotated to correspond to the cut plane. The values for the physical property at the pixel positions are interpolated from the surrounding measurements of actual values. Cross-sectional images are thereby supplied interactively in real time to support, for example, ongoing surgical procedures.

12 Claims, 6 Drawing Sheets

SYSTEM AND METHOD FOR DISPLAYING OBLIQUE PLANAR CROSS SECTIONS OF A SOLID BODY USING TRI-LINEAR INTERPOLATION TO DETERMINE PIXEL POSITION DATAES

TECHNICAL FIELD

This invention relates to display systems and, more particularly, to the display of arbitrarily chosen cross sections of solid bodies for which values of physical properties are available at regular grid positions within the interior of such bodies.

BACKGROUND OF THE INVENTION

It is well known to obtain three-dimensional arrays of data representing one or more physical properties at regular grid positions within the interior of solid bodies. Such data can be obtained by non-intrusive methods such as computed axial tomographic (CAT) x-ray scanning systems, by nuclear magnetic resonance (NMR) imaging systems, or by other non-intrusive mechanisms such as ultrasound, positron emission tomography (PET), emission computed tomography (ECT) and multimodality imaging (MMI). Each of these techniques produces a planar, grid-like array of values for each of a succession of slices of the solid object, thus providing a three-dimensional array of such values. Typically, the solid object is a human body or a portion thereof, although the method is equally applicable to other natural or artificial bodies. In the case of CAT scanning, the physical value would be the coefficient of x-ray absorption. For NMR imaging, the physical value would be the spin-spin or the spin-lattice relaxation time. In any event, the measured physical values reflect the variations in composition, density or surface characteristics of the underlying physical structures. Such a three-dimensional data array typically consists of a plurality of sets of three-dimensional (x, y, z) coordinates distributed at regular positions in a cubic or parallelepiped lattice within the body, and at least one value ($V_{xyz}$) of the physical property being associated with each respective one of the coordinate positions. Each cubically adjacent set of eight such positions defines a cubic volume called a "voxel" with a physical property value being specified for each of the eight voxel vertices.

It is likewise known to utilize such three-dimensional arrays of interior physical values to generate visual images of the interior structures within the body. In the case of the human body, the visual images thus produced can be used for medical purposes such as diagnostics or for the planning of surgical procedures. In order to display two-dimensional images of such three-dimensional interior structures, however, it is necessary to locate the position of the surface of such structure within the array of physical values. This is accomplished by comparing the array values to a single threshold value, or to a range of threshold values, corresponding to the physical property values associated with that surface. Bones or any other tissue, for example, can be characterized by a known range of density values to which the array values can be compared. Once the surface location is determined, this surface must be shaded so as to give the human eye the correct impression of the shape and disposition of that surface when it is displayed on a two-dimensional display device. To provide such shading, the angular direction of a vector normal or orthogonal to the surface at each point on the surface is compared to the viewing angle of the observer. The intensity of shading can then be adjusted so as to be proportional to the difference between these angles. Such angular difference information can also be used to control the colors incorporated in the displayed images, thus providing yet another visual clue to the surface disposition. Normal vectors with components directed away from the viewing angle can be ignored since the associated surfaces are hidden from view.

One method for approximating the surface of an internal structure is the so called "marching cubes" method, disclosed by H. E. Cline et al. U.S. Pat. No. 4,710,876, granted Dec. 1, 1987, and assigned to applicants' assignee. In this method, the surface segment intersecting a voxel is approximated by one of a limited number of standardized plane polygonal surfaces intersecting the voxel. One particular standardized surface is selected by a vector representing the binary differences between the threshold value and the eight voxel vertex values. The surface-to-voxel intersection coordinates, as well as the normal vector, for each such standardized polygonal surface set can then be calculated or obtained by table look-up techniques. The final surface is assembled as a mosaic, using all the standardized polygons as tessera or tiles. Appropriate intensity values derived from the normal vector angles can be displayed immediately for viewing, or stored for later display. H. E. Cline et al. U.S. Pat. No. 4,729,098, granted Mar. 1, 1988, and also assigned to applicants' assignee, shows a variation of the marching cubes method using nonlinear interpolation to locate more accurately the coordinates of the tessellated standardized polygons.

Another method for approximating the surface of an internal structure is the so-called "dividing cubes" method, disclosed in H. E. Cline et al. U.S. Pat. No. 4,719,585, granted Jan. 12, 1988, and also assigned to applicants assignee. In this method, the values at the vertices of the voxel are used to interpolate, in three dimensions, values at regularly positioned intra-voxel sub-grid locations. These interpolated sub-grid values can then be used to locate the surface position more precisely and to calculate the normal vector more accurately.

In order to distinguish between different internal structures with the same or similar physical property values, W. E. Lorensen et al. U.S. Pat. No. 4,751,543, granted June 14, 1988, and likewise assigned to applicants' assignee, discloses a technique for labeling surfaces with similar property values and using adjacency criteria with respect to a "seed" location in the particular structure of interest to segregate the desired surface from all of the labeled surfaces. The copending application of H. E. Cline et al., U.S. Pat. No. 4,791,567, filed Sept. 15, 1986, also assigned to applicants' assignee, discloses another technique of segregating similar structures by determining connectivity from adjacency information. U.S. Pat. No. 4,821,213, filed Dec. 19, 1986, for H. E. Cline et al., and also assigned to applicants' assignee, discloses yet another technique for differentiating internal structures in which a linear pass is made through the data array to locate and label all of the different structures along the scan line by counting structure interfaces.

The generation of surface locations and normal vectors for three-dimensional solid objects such as bones is significantly speeded up by performing these two determinations in parallel. As shown in the copending application H. E. Cline et al., U.S. Pat. No. 4,821,213, filed Dec. 19, 1986, and assigned to applicants' assignee, normal vectors are generated from "near neighbor" values in one of two parallel processing paths. The boundaries of the extended three-dimensional structure are simultaneously located in a parallel processing path by comparisons with one or more different threshold values representing one or more differential structural interfaces in the body, thereby to label the extended structure.

Thus it is known to use a single array of values of a physical property within the interior of a solid body to generate perspective images of arbitrarily selected internal structures within the body, seen as if viewed from arbitrarily chosen viewing angles, all by manipulating the selfsame single array of values. It is however, also desirable to view the solid body in cross section in order to see, not only the three-dimensional internal structures, but also to see the detailed spatial relationships between the different internal structures. These spatial relationships are particularly important for planning surgical procedures which impact on a plurality of the internal structures and which require a detailed foreknowledge of interstructural relationships. Organ transplants, for example, require detailed information concerning the size and geometry of the internal cavity into which the organ is to be inserted as well as the disposition of the neighboring organs.

While a simple display of one slice of the three-dimensional data will provide a cross-sectional view of the solid body, the view thus obtained may be inappropriate for the particular use intended. A preferred cross-sectional viewing plane which is orthogonal to structural interfaces may, for example, lie at some oblique angle to the orientation of the data acquisition slices. In that case, detailed and accurate cross-sectional views are not so readily obtained. Moreover, the need for real time, interactive generation of such images to support ongoing medical or surgical procedures is not readily met by the techniques available to the prior art.

Accordingly, one object of the invention is to provide an interactive method and apparatus for displaying two-dimensional cross-sectional images of a three-dimensional body.

Another object of the invention is to provide a system for displaying a three-dimensional array of physical values in a two-dimensional cross section taken in a selectable viewing plane.

Another object of the invention is to provide a system for displaying, with controllable pixel density, two-dimensional cross-sectional images of a three-dimensional body.

Another object of the invention is to provide a system for displaying in real time, with selectable enlargement capability, two-dimensional cross-sectional images of a three-dimensional body.

SUMMARY OF THE INVENTION

In accordance with the illustrative embodiment of the present invention, cross sections at arbitrarily selected cut planes are displayed for three-dimensional regular arrays of physical values by (1) rotating and displacing a plane of pixel locations to coincide with the desired cross-sectional cut plane and (2) calculating, for each pixel on the cut plane, a value for the physical property at the pixel location by tri-linear interpolation, using the original values at the vertices of the voxel including the pixel. In this regard, a pixel is defined as a single picture element on a two-dimensional array of picture elements making up the two-dimensional picture. A voxel, as defined above, is a three-dimensional parallelepiped in the data space having data values specified for each of the eight vertices of the parallelepiped. Such voxels are formed from the original array of data by assembling four cubically adjacent values from each of two successive planar arrays (slices) of data.

The resolution of the final cut plane image is arbitrarily controlled by selecting the pixel location density in the original rotated plane of pixels. A value is then interpolated for each pixel in the rotated plane. More specifically, for each pixel location (x, y, z) translated into the cut plane, the translated pixel location is specified by x,y,z coordinates, each such coordinate being represented in integer and fractional units normalized to the voxel edge dimension. The integer parts of the x-y-z coordinates $1x$, $1y$, $1z$) are used to select the particular voxel containing the pixel. The fractional parts of the coordinates (Fx-Fy-Fz) are used to interpolate the pixel value from the eight vertex values of the selected voxel. Using special purpose integrated circuit chips or a high speed (possibly parallel processing) digital computer, the pixel position rotations and value interpolations can be done sufficiently fast to permit real time, interactive selection of the cutting plane as cross sections are being displayed. Moreover, the pixels can be generated, one at a time, in a raster scan order on the cutting plane and immediately displayed as generated. In this way, the cross-sectional image is displayed as fast as it can be generated, further increasing the speed of response of the cross section generator. Finally, the pixel density can be selected to correspond to the resolution capacity of the display device, thus taking full advantage of the resolution capability of the display device.

In further accord with the present invention, a portion only of the cut plane can be selected and enlarged for display, thus providing real time "zooming" capability in the cross section generator of the present invention. More particularly, the coordinates of a "window" in the cut plane can be used to select only a portion of the cut plane pixel positions. Data values for only this subset of pixel positions need then be calculated for viewing. The pixel density in such a window can be increased to again maximize the resolution in the resulting smaller partial plane cross-sectional display. Using this zooming capability, the body can be "searched" by lower resolution, full body cross-sectional scans to locate the particular structures of immediate interest. The structures of interest thus located can then be displayed in greater detail by increasing the pixel resolution in a smaller window within the selected body cross section.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

In the method and apparatus of the present invention, a sequence of voxel elements is used to calculate the value of included pixels. In accordance with the present invention, data from consecutive NMR or CAT scan slices are assembled into a three-dimensional array of values which can then be analyzed or processed to obtain two-dimensional images of the three-dimensional information. The derivation of such three-dimensional interior data arrays is well known in the art and will not be further described here. It is sufficient to note that such data arrays are readily obtainable by well-known, non-intrusive methods such as computed axial tomographic (CAT) x-ray scanning systems, by nuclear magnetic resonance (NMR) imaging systems, by ultrasound scanning, by positron emission tomography (PET), by emission computed tomography (ECT) and by multimodality imaging (MMI). Such methods produce planar arrays of data points, one planar array at each of a regular succession of adjacent "slices" through the solid body being scanned. Taken together, this succession of slices forms the three-dimensional array of data values.

Figure 1:
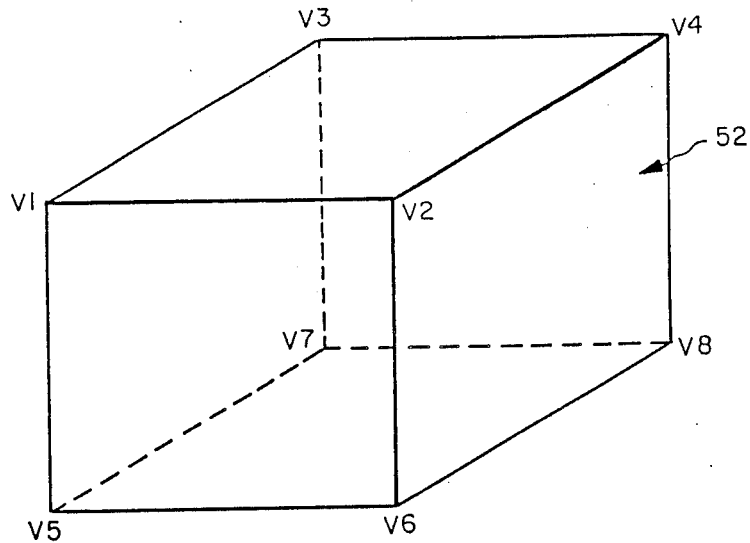
FIG. 1 is a perspective view illustrating a single voxel element defined by eight grid locations in an array of physical values obtained by non-intrusive means, useful in explaining the operation of the invention.

The array nature of such data values can be seen in FIG. 1 which illustrates a single voxel element 52 with vertices V1 through V8. Each voxel element, like element 52, spans two successive slices of data values. Associated with each vertex V1-V8 of the voxel element 52 is a data value which represents the measurement of at least one physical property which is associated with the corresponding spatial position within the three-dimensional body. The spatial positions are located in regular patterns defining regularly spaced grid locations within the body. The grid positions, in turn, define a plurality of adjacent voxels like voxel 52 in FIG. 1.

Figure 2:
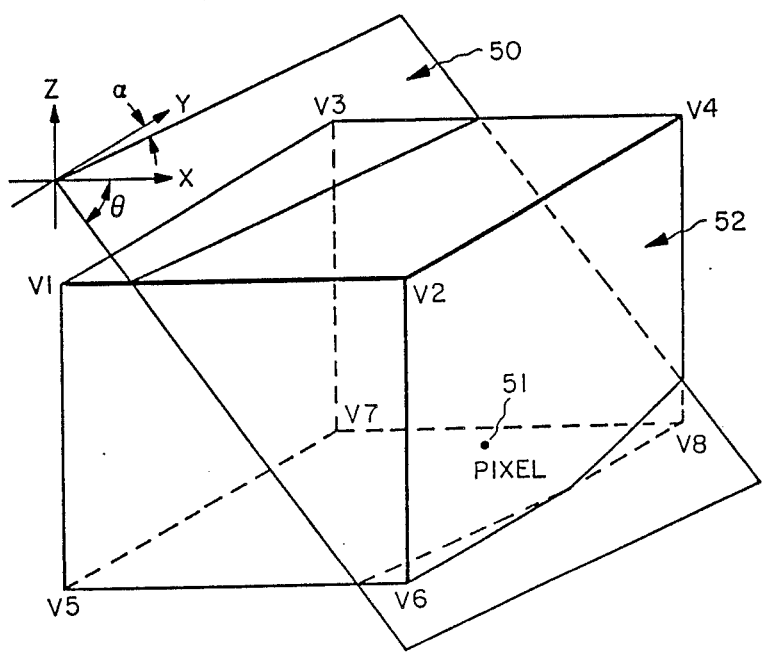
FIG. 2 is a perspective view of an arbitrarily oriented cut plane intersecting the volume of the voxel element shown in FIG. 1, also useful in explaining the operation of the present invention.

In accordance with the illustrative embodiment of the present invention, a plane of pixel locations is rotated and translated to coincide with the cut plane along which a cross-sectional view is to be displayed. An illustration of such a rotated and translated plane is shown in FIG. 2 for the same voxel as that shown in FIG. 1. Referring then to FIG. 2, there is shown a portion 50 of a cut plane in the vicinity of voxel 52 of FIG. 1. The cut plane section 50 includes a single pixel location 51 within the interior of voxel 52. As will be explained in detail hereinafter, the density of the pixels is controllable and hence there might well be more than one pixel location within voxel 52, or there might be no pixel locations within voxel 52. The cut plane 50 makes an angle $\theta$ with the x-axis and an angle $\alpha$ with the y-axis of the data coordinate system of which voxel 52 is a part. After angular rotation, the cut plane 50 is displaced in the vertical direction by a line segment length $L_z$ in the z direction (not shown in FIG. 2) from the origin of the coordinate system, usually taken as some location on the exterior of the data array coordinates. The relationships necessary to rotate and translate three-dimensional coordinate positions are well known, and are disclosed in *Fundamentals of Interactive Computer Graphics*, by J. D. Foley and A. Van Dam, Addison-Wesley Publishing Co., Reading, Mass., 1982, at pages 255-261. In particular, equation (7.42) at page 258 of the reference teaches a rotation and translation matrix of the following form:

$$[x\ y\ z] = [x\ y\ z] \times \begin{bmatrix} R_{11} & R_{12} & R_{13} & 0 \\ R_{21} & R_{22} & R_{23} & 0 \\ R_{31} & R_{32} & R_{33} & 0 \\ t_x & t_y & t_z & 1 \end{bmatrix} \quad (1)$$

where x, y and z are the initial coordinates, $M_{ij}$ are the rotational coefficients, and $t_n$ are the translation coefficients. As noted in the Foley reference, computational efficiencies are achieved by applying the rotational $3 \times 3$ matrix R separately prior to the application of the translation matrix T, particularly when the x and y components of the translation are zero, as in the present case.

Figure 3:
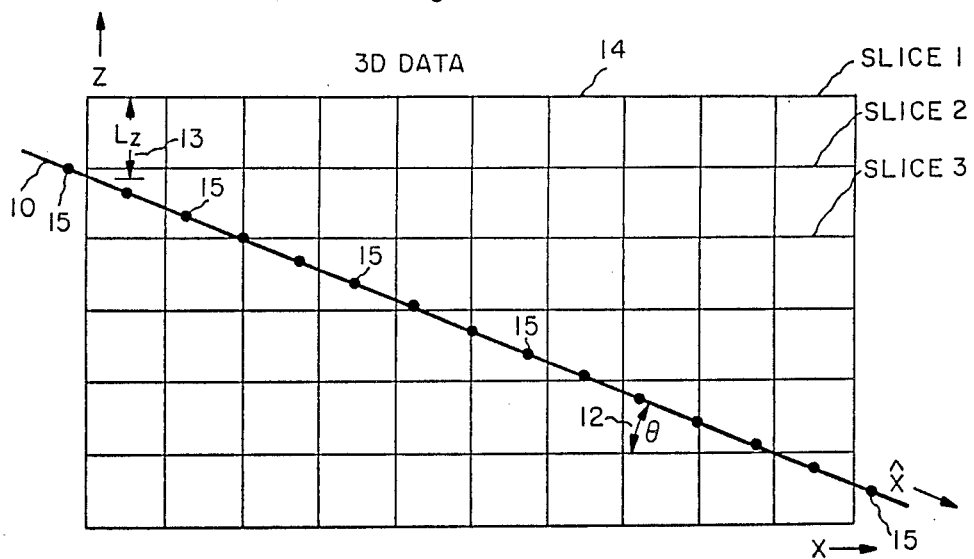
FIG. 3 is a schematic two-dimensional illustration of a rotated plane (line) of pixels useful in understanding the method and system of the present invention.

FIG. 3 shows a schematic, two-dimensional illustration of a plane of pixels rotated and displaced to lie along the desired arbitrary cut plane. A cut plane can be specified by an angular orientation and by a distance from the origin of the three-dimensional volume of the data voxels. Thus, in FIG. 3, the cut plane 10 (seen on edge for convenience) is uniquely identified by the length $L_z$ of line segment 13 and the angle 12 ($\theta$) cut plane 10 makes with the x-axis of the coordinate system specifying the voxel locations. The selected cut plane 10 is that plane located at the end of vector 13 and making the angle $\theta$ with the x-axis of the coordinate system of FIG. 3. In three dimensions, of course, the angular orientation of the cut plane is specified by two angles, the angle 12 with the x-z plane, corresponding to the angle $\theta$ in FIG. 2, and a similar angle with the x-y plane, not visible in FIG. 3, but corresponding to the angle $\alpha$ in FIG. 2. The position and orientation of the cut plane 10 can therefore be uniquely specified by an angular orientation ($\theta$ and $\alpha$) and a vector length ($L_z$) from the origin of the data grid. In order to arbitrarily select cut planes, it is therefore necessary to provide a mechanism for specifying the angular orientation and the depth of the cut plane.

A plane corresponding, for example, to the x-z plane, i.e., lying along x-axis 14 in FIG. 3, is initially populated with an array of pixel positions, corresponding to pixel positions 15 in cut plane 10. The density of the pixel positions is controllable and corresponds to the desired resolution of the ultimately displayed image. Using the relationships of equation (1), the plane of pixel positions is then rotated and displaced in the z direction to coincide with the cut plane 10. Thus, each of dots 15 corresponds to one row of pixels in the cut plane 10. More specifically, a pixel position x,y,z is rotated by rotation coefficients $M_{ij}$ and displaced in the z direction by the length $L_z$ to a point x,y,z in the data space. The rotational relationships reduce to:

$x = M_{11}x + M_{12}y + M_{13}z$ $y = M_{21}x + M_{22}y + M_{23}z$ $$z = M_{31}x + M_{32}y + M_{33}z. \qquad (2)$$

The rotation operations of equations (2), of course, are equivalent to the rotation matrix R of equation (1). The rotated plane is then translated in the z direction by a distance $L_z$ to coincide with cut plane 10 in FIG. 3 by subtracting the value $L_z$ from each of the z components.

As a result of the rotation operation of equations (2), and the subsequent linear translation, a plane of pixel positions is defined which lies on the desired cut plane and which includes the pixel position density necessary to provide the desired resolution of the ultimate image. Each pixel position consists of the x, y, z values given by equations (2), translated in the z direction by the value $L_z$. For convenience, each of these values is normalized to integer and fractional voxel edge units. That is, each of the transformed values has an integer part (i.e., before the decimal point) and a fractional part (i.e., after the decimal point), expressed in units equal to the length of one edge of a voxel. These values will be used as described hereinafter. The only remaining operation is to determine a data value for each of these pixel positions. These data values, in turn, control the intensity of the image at that particular pixel point. In accordance with the present invention, these data values are determined by tri-linear interpolation as will be discussed in connection with FIG. 4.

Figure 4:
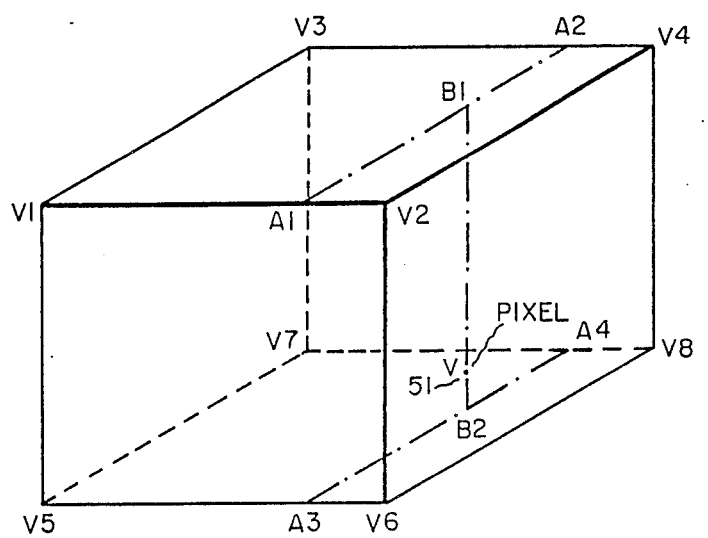
FIG. 4 shows the methodology for tri-linear interpolation used in calculating the value of a single pixel located within the volume of a single voxel in accordance with the present invention.

Referring more particularly to FIG. 4, there is shown a perspective view of one voxel of the three-dimensional data accumulated, for example, by CAT scan techniques. The voxel of FIG. 4 includes eight vertices V1 through V8. A data value is available for each of the grid positions corresponding to vertices V1-V8. In accordance with the present invention, a data value V for the pixel location 51 on the cut plane is interpolated in three dimensions by using the surrounding data values V114 V8 at the voxel vertices. Since the pixel positions have already been generated in integer and fractional voxel form, the integer coordinate portions (1x, 1y, 1z) can be used to identify (and hence access) the corresponding voxel vertex values. The fractional coordinates (Fx, Fy, Fz) can then be used to perform the three-dimensional interpolation necessary to obtain the data value at pixel position V. More specifically, using the nomenclature of FIG. 4, the data value V can be determined from the following equations:

$$A1 = V1 + Fx * (V2-V1)$$

$$A2 = V3 + Fx * (V4-V3)$$

$$A3 = V5 + Fx * (V6-V5)$$

$$A4 = V7 + Fx * (V8-V7)$$

$$B1 = A1 + Fy * (A2-A1)$$

$$B2 = A3 + Fy * (A4-A3)$$

$$V = B1 + Fz * (B2-B1) \qquad (3)$$

As can be seen from equations (3) and FIG. 4, edges V1-V2, V3-V4, V5-V6 and V7-V8 are divided in proportion to the fractional voxel coordinate Fx in the x direction to obtain points A1-A4. Once the values at positions A1-A4 have been interpolated, points B1 and B2 are located by interpolating between the line segments A1-A3 and A2-A4, using the data values at positions A1-A4 and the fractional voxel coordinate Fy in the y direction. Finally, given the data values at points B1 and B2, the data value at the pixel position V is determined by interpolating between points B1 and B2, using the fractional voxel coordinate Fz in the z direction. In each case, the interpolation is linear, using the fractional coordinates (Fx, Fy, Fz) obtained from the rotational operation of equations (2).

Figure 5:
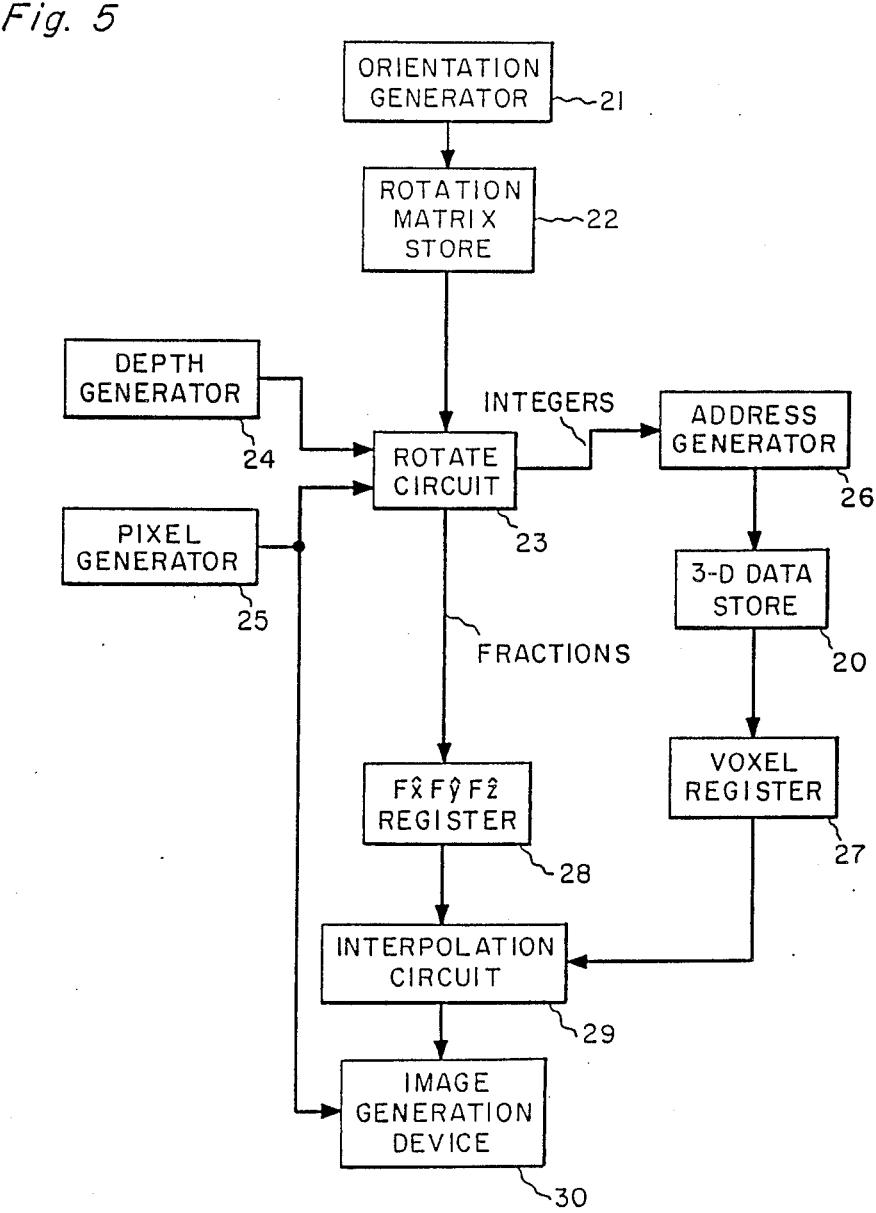
FIG. 5 is a block diagram of a system for generating cut plane images in accordance with the present invention.

One implementation of the present invention is illustrated in the detailed block diagram of FIG. 5. Referring then to FIG. 5, there is shown a cross-sectional image generation system comprising a three-dimensional memory storage system 20 for storing a three-dimensional array of values of at least one physical property at regular grid points in the interior of a physical body. The physical body may be a human body or any other body for which the internal structure is not readily seen, but for which internal physical data can be acquired by such non-intrusive means as CAT scanning or NMR imaging. The techniques for acquiring such three-dimensional data are well known and will not be further described here.

A user-controlled cut plane orientation device 21 allows the user to specify the angular orientation of the cut plane along which the cross-sectional image is to be generated. This orientation can be specified by two angles, one from the x plane and the other from the y plane, as illustrated in FIG. 2. Such angular input can be specified by keyboard, rheostat, joy-stick, mouse, or any other analog input device. In the preferred embodiment, a track-ball having two degrees of angular freedom is used to specify cut plane orientation. Such track-balls are well known in the art and will not be further described here. The angular specification of the orientation of the cut plane is applied to a matrix storage device 22 which contains the rotational coefficients $M_{11}$ through $M_{33}$ of equations (2). It will be understood that different rotational coefficients are used for different cut plane orientations. The function of matrix store 22 is to store all of the coefficients for each of the possible rotations, quantized to the granularity made possible with the orientation input device 21 and consonant with the resolution of the display device to be used. Orientation device 21 then operates to select the specific coefficients required for a particular set of orientation angles from an array of such coefficients. Alternatively, the necessary matrix coefficients can be calculated "on the fly", i.e., during ongoing operation, as needed, using the standard coordinate translating equations discussed in the before-mentioned Van Dam reference. These coefficients are supplied from matrix store 22 to a rotate operator circuit 23. At the same time, a depth selection device 24 is used to select the depth ($L_z$) of the cut plane from the coordinate origin at the outer surface of the three-dimensional body. This depth indication is also supplied to rotate circuit 23 to provide a simple z-axis offset to the calculated cut plane position values. Depth generator 24 may comprise a keyboard, rheostat or other analog input device. A linear slide rheostat is the preferred depth input device to provide a sense of linear movement within the data space.

A pixel generating device 25 is used to specify the pixel density on the cut plane. This pixel density generation is conveniently implemented by an x-axis counter and a y-axis counter. The x-axis counter is driven by clock pulses to sequentially generate x-axis pixel locations. The x-axis counter is reset at the pixel position corresponding to the end of each scanned horizontal line. The y-axis counter is advanced by one each time the x-axis counter is reset and thus provides the y-axis pixel locations. Pixel density is controlled by selecting only a subset of the generated x-axis and y-axis pixel locations (every count, every other count, every third count, etc.). These selected pixel locations are simultaneously supplied to rotate circuit 23 and to an image generating device 30. The rotate circuit 23 of FIG. 5 implements the transformations specified by equations (2) and the linear translation in the z direction. Circuit 23 may comprise, for example, special purpose high speed integrated circuit chips to perform the multiplications, additions and subtractions in a parallel fashion. Alternatively, circuit 23 may be implemented by a programmed computer, either a high speed serial computer, or a parallel multiprocessor computer. In any event, the rotation operations specified by equations (2) are performed sufficiently rapidly to permit real time, interactive display of cross-sectional views as the user manipulates the orientation device 21 and the depth device 24. For this purpose, devices 21 and 24 may comprise any readily manipulated, continuously selective analog or digital input devices.

As discussed in connection with equations (2), the rotational transformation of x, y and z into x, y, and z produces an integer portion and a fractional portion for each component. The integer portion of each component of the translated pixel position is fed to an address generator 26 which generates the address of the particular voxel within which the corresponding pixel is located. Since the voxels are cubical, and if the rotational arithmetic is carried out in units equal to a voxel edge length, then the integer portion of the resulting transformed coordinate is the address offset for that particular voxel in each coordinate direction. In any event, the address of the voxel in which the particular pixel is located is supplied to three-dimensional memory 20 to select the data values associated with the addressed voxel and place these data values in voxel register 27.

At the same time, the fractional portion of each component of the translated pixel location is supplied to a fractional storage register 28. An interpolation circuit 29 uses the voxel data values in voxel register 27 and the fractional pixel component values in register 28 to implement the three-dimensional linear interpolation of equations (3). As in the case of rotation circuit 23, interpolation circuit 29 may comprise special purpose integrated circuit chips carrying out the arithmetic relationships of equations (3), or may comprise a high speed serial programmed digital computer or a parallel processor. In any event, interpolation circuit 29 supplies an interpolated data value for each of the pixel positions specified by pixel generator 25. These data values, along with the corresponding pixel positions from generator 25, are supplied to an image generator 30. Since the pixel values are generated in synchronism with the pixel locations, the pixels can be immediately displayed by image generator 30. Indeed, if the pixel positions are supplied by pixel generator 25 in the same order as the pixel plane would be scanned by a raster scanner, then the cross-sectional image can be displayed as it is generated, without any intermediate storage. Since rapid display is one of the principal goals of the present invention, it is the preferred embodiment of the invention to provide such raster scanning sequence of pixel values. Alternatively, the pixel values can be stored as a matrix of intensity values to be displayed at a later time. Presumably, the desired cross-sectional image will be saved as a stored matrix in long term storage facilities for later reviewing.

In summary, the pixel generator 25 supplies a sequence of pixel coordinates x, y and z to the rotate circuit 23. For each set of pixel coordinates thus supplied, rotate circuit 23 (using orientation information from generator 21 and depth information from generator 24) generates the integer and fractional portions of the corresponding translated and rotated x, y and z coordinates. The integer portion of these translated and rotated coordinates is supplied to address generator 26 while the fractional portion is supplied to register 28. The address provided by address generator 26 accesses three-dimensional memory 20 to retrieve the voxel data values corresponding to that voxel address. The retrieved data values are stored in voxel register 27 and used, together with the fractional voxel coordinates in register 28, to calculate the interpolated pixel value corresponding to the initially supplied pixel coordinates from pixel generator 25. The pixel coordinates from generator 25 and the pixel intensity values from interpolation circuit 29 are used by image generator circuit 30 to generate and display the corresponding pixel of the cross-sectional image.

It can be seen that the cross section generator of the present invention can be used interactively, in real time, to generate a plurality of cross-sectional images on device 30. Indeed, the user can manipulate the orientation generator 21 and the depth generator 24 to search for the particular cross section desired. Furthermore, the pixel generator 25 can be manipulated, by gating the desired subset of pixel locations to rotate circuit 23, to control the resolution (pixels per square inch) of the resulting image. In this way, the resolution capacity of the image generation device 30 can be exactly matched by the pixel density of the cross-sectional image, thus optimizing the resolution of the overall system.

The pixel location coordinates generated by pixel generator 25 in FIG. 5 can be selected to be within any desired range of x and y values. In this way, a window can be created in the cut plane to display only a portion of the cross section. By expanding the window to fill the entire screen of the display device, a "zoom" effect can be implemented. Moreover, the resolution within the enlarged window can be increased by increasing the pixel density in that window area, thus simultaneously providing a restricted viewing window and a concomitantly higher resolution image. Only the data values for the restricted area are generated since only these pixel locations are passed on to rotate circuit 23.

Figure 6:
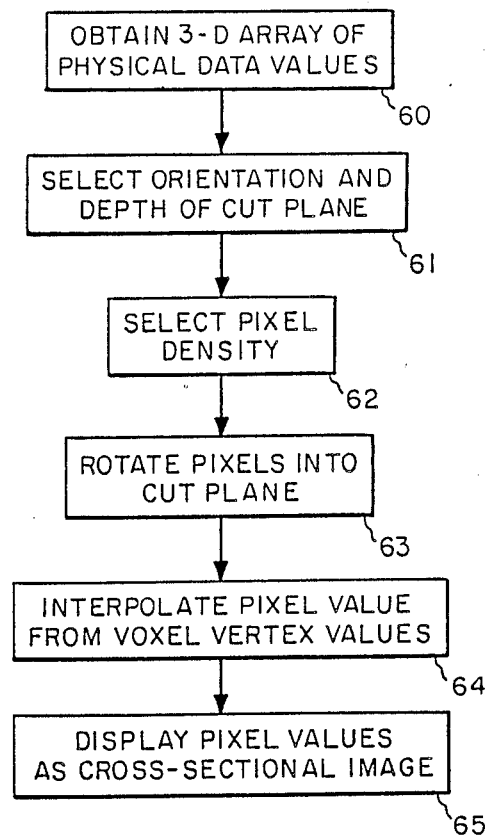
FIG. 6 is a flowchart of the operations performed by the system of FIG. 5.

FIG. 6 is a flowchart of the operations performed by the block diagram of FIG. 5, with each box signifying a separate operation. In box 60 of FIG. 6, the three-dimensional array of physical data values is obtained, either by searching a stored array of such values, or by generating values by non-intrusive body scanning techniques. In box 61, the orientation and depth of the cut plane is selected in order to fully specify the cross section to be viewed. In box 62 the pixel density is selected to control the resolution of the displayed image. The pixels thus specified are translated into the selected cut plane in box 63, using the translation formulae of equations (2). In box 64, the pixel values are interpolated from the voxel vertex values of the voxel in which the translated pixel is located. Finally, in box 65, the pixel locations and the pixel values are combined to form a cross-sectional image.

It should also be clear to those skilled in the art that further embodiments of the present invention may be made by those skilled in the art without departing from the teachings of the present invention.

What is claimed is:

1. A system for displaying two-dimensional cross-sectional images of three-dimensional data arrays, said system comprising:
    means for storing three-dimensional signal patterns representing the value of at least one physical property associated with a three-dimensional body at regularly spaced parallelepiped grid locations defining volume elements within said body;
    means for defining a plane of picture element positions of a preselected position density which density corresponds to the desired resolution of an ultimately displayed cross-sectional image;
    means for rotating and displacing said plane of picture element positions to correspond with an arbitrarily chosen cut plane through said body;
    means for determining physical property values for each of said rotated and displaced picture element positions by tri-linear interpolation between the immediately surrounding ones of said signal pattern values defining the volume element in which said picture element is located; and
    display processor means for receiving said rotated and displaced picture element positions and said corresponding interpolated picture element values and displaying said values on a screen, the displayed values representing said cross-sectional image.

2. The system according to claim 1 further comprising:
    variable means for selecting any value in a continuity of displacement and rotation values for said cut plane.

3. The system according to claim 1 further comprising:
    variable means for selecting the density of said picture element positions on said cut plane.

4. A method for displaying two-dimensional cross-sectional images of three-dimensional data arrays, said method comprising the steps of:
    storing three-dimensional signal patterns representing the value of at least one physical property associated with a three-dimensional body at regularly spaced parallelepiped grid locations defining volume elements within said body;
    defining a plane of picture element positions of a preselected position density which density corresponds to the desired resolution of an ultimately displayed cross-sectional image;
    translating said plane of picture element positions to correspond with an arbitrarily chosen cut plane through said body;
    determining the physical property values for each said translated picture element position by tri-linear interpolation between the immediately surrounding ones of said signal pattern values defining the volume element in which said picture element is located; and
    receiving said translated picture element positions and said corresponding interpolated picture element values in a display processor operating to display said values on a screen, the displayed values representing said cross-sectional image.

5. A system for displaying cross-sectional images of a three-dimensional body, said system comprising:
    means for storing a three-dimensional array of values of at least one physical property at regularly located points in the interior of said body;
    means for translating a planar array of pixel positions to correspond with an arbitrarily selected cut plane through said body;
    means for tri-linearly interpolating a value for each said translated pixel position from the voxel vertex values surrounding said translated pixel position; and
    means for displaying said interpolated values.

6. The system according to claim 5 further comprising
    controllable means for arbitrarily selecting the position and orientation of said cut plane.

7. The system according to claim 5 further comprising
    means for utilizing said interpolating means in raster scan order on said cut plane, and
    means for displaying said interpolated values as soon as each of said values is generated.

8. The system according to claim 5 further comprising
    controllable means for selecting a portion of said cut plane within the boundaries of said body for enlarged partial cross-sectional display.

9. The system according to claim 5 further comprising controllable means for selecting density of said pixel positions on said planar array.

10. A method for displaying cross-sectional images of a three-dimensional body for which an array of values of a physical property are available, said method comprising the steps of:
    translating a planar array of pixel positions to correspond with an arbitrarily selected cut plane through said body;
    tri-linearly interpolating a value for each translated pixel position from the array of values immediately surrounding that translated pixel position; and
    displaying said interpolated values.

11. A system for displaying two-dimensional images of three-dimensional data arrays, said system comprising:
    means for storing an array of signal values representing the value of a physical property at each of a plurality of grid positions within a three-dimensional body;
    means for selecting a viewing surface for viewing the internal structure of said three-dimensional body;
    means for tri-linearly interpolating picture element values at each of a plurality of picture element positions substantially on said viewing surface from the physical values in each said array surrounding each respective one of said picture element positions; and
    means for displaying said picture element values at corresponding picture element positions on said viewing surface.

12. A method for displaying two-dimensional images of three-dimensional data arrays, said method comprising the steps of:
    storing an array of signal values representing the value of a physical property at each of a plurality of grid positions within a three-dimensional body;
    selecting a viewing surface for viewing the internal structure of said three-dimensional body;

tri-linearly interpolating picture element values at each of a plurality of picture element positions substantially on said viewing surface from the physical values in each said array surrounding each respective one of said picture element positions; and displaying said picture element values on a display device at display positions corresponding to said picture element positions on said viewing surface.

* * * * *